United States Patent
Yeh et al.

(10) Patent No.: US 7,599,558 B2
(45) Date of Patent: Oct. 6, 2009

(54) LOGO PROCESSING METHODS AND CIRCUITS

(75) Inventors: Chia-Hung Yeh, Tai-Nan (TW);
Hsuan-Huei Shih, Taipei (TW)

(73) Assignee: MAVs Lab. Inc., Taipei (TW)

( * ) Notice: Subject to any disclaimer, the term of this patent is extended or adjusted under 35 U.S.C. 154(b) by 709 days.

(21) Appl. No.: 11/161,954

(22) Filed: Aug. 24, 2005

(65) Prior Publication Data
US 2007/0052854 A1  Mar. 8, 2007

(51) Int. Cl.
*G06K 9/00* (2006.01)
(52) U.S. Cl. ............. 382/181; 382/100; 382/103; 382/209; 348/565
(58) Field of Classification Search ............ 382/100, 382/103, 181, 209, 325; 348/565
See application file for complete search history.

(56) References Cited

U.S. PATENT DOCUMENTS

| | | | |
|---|---|---|---|
| 6,201,879 B1 | 3/2001 | Bender et al. | |
| 6,658,057 B1 | 12/2003 | Chen et al. | |
| 2002/0180870 A1* | 12/2002 | Chen | 348/207.1 |
| 2003/0076448 A1* | 4/2003 | Pan et al. | 348/589 |
| 2003/0091237 A1* | 5/2003 | Cohen-Solal et al. | 382/204 |
| 2005/0053356 A1* | 3/2005 | Mate et al. | 386/52 |
| 2005/0078222 A1* | 4/2005 | Liu et al. | 348/700 |
| 2005/0078223 A1* | 4/2005 | Liu et al. | 348/701 |

FOREIGN PATENT DOCUMENTS

| | | |
|---|---|---|
| CN | 1394437 A | 1/2003 |
| TW | 548984 | 8/2003 |
| TW | 589876 | 6/2004 |

OTHER PUBLICATIONS

Yan et al., "Automatic Video Logo Detection and Removal", Multimedia Systems, vol. 10 Issue 5 Aug. 2005, pp. 379-391, received Jan. 3, 2004 and published online Jul. 7, 2005 ISSN 1432-1882.*
Alberto Albiol, Maria Jose CH. Fulla, Antonio Albiol, and Luis Torres, "Detection of TV commercial.", 2004.
Aya Soffer and Hanan Samet, "Using Negative Shape Features for Logo Similarity Matching,", 1998.
David S. Doermann, Ehud Rivlin and Isaac Weiss, "Logo Recognition Using Geometric Invariants," 1993 IEEE, pp. 894-897.
Bohumil Kovar, Alan Hanjalic, "Logo Detection and Classification in a Sport Video: Video Indexing for Sponsorship Revenue Control," Proc. SPIE, pp. 183-193, vol. 4676, 2002.
Thomas Hargrove, "Logo Detection in Digital Video," Math 100, Mar. 6, 2001.

* cited by examiner

*Primary Examiner*—Matthew C Bella
*Assistant Examiner*—Eric Rush
(74) *Attorney, Agent, or Firm*—Winston Hsu

(57) ABSTRACT

A logo processing method includes: within a plurality of video frames sequentially received from a video source, comparing a base frame with at least a portion of the other video frames to generate a mask having at least one candidate region probably corresponding to at least one logo; performing post processing on the mask to correct the candidate region(s); and selecting at least one of the candidate region(s) as logo region(s) for indicating the logo(s).

22 Claims, 5 Drawing Sheets

LOGO PROCESSING METHODS AND CIRCUITS

BACKGROUND OF THE INVENTION

1. Field of the Invention

The present invention relates to video playback devices, and more particularly, to logo processing methods and circuits.

2. Description of the Prior Art

Logos are widely applied to television (TV) programs to announce the copyright of the producer thereof or the service provider thereof. A program recorded in an optical disc such as a digital versatile disc (DVD) would probably have a logo thereon for similar purposes.

As the logo on the program is not directly related to the content of the program, and as the logo sometimes partially blocks a certain video object shown in the program, most program watchers feel bothered while the logo occupies a corner of a screen of a TV set or a monitor. In addition, if most of the time, the logo occupies the same corner of the screen of the TV set or the monitor, especially for that utilizing a plasma display panel (PDP), the display cells for displaying the logo on the PDP will burn out or have lower performance in contrast to the other display cells on the PDP some day.

According to some transmittance specifications, a first logo in a digital TV program would probably be removed as if it never appears since the first logo and the program are not mixed before transmitting from the service provider wirelessly or through a cable to the end user. However, if the digital TV program has a second logo originally mixed thereon, i.e., the second logo was mixed in program content, the logo removal architecture according to the transmittance specifications mentioned above will never work for the second logo.

SUMMARY OF THE INVENTION

It is an objective of the claimed invention to provide logo processing methods and circuits to detect at least one logo that is originally mixed in program content.

It is another objective of the claimed invention to provide logo processing methods and circuits to change at least one color of at least one logo that is originally mixed in program content.

According to one embodiment of the claimed invention, a logo processing method is disclosed. The logo processing method comprises: within a plurality of video frames sequentially received from a video source, comparing a base frame with at least a portion of the other video frames to generate a mask having at least one candidate region probably corresponding to at least one logo; performing post processing on the mask to correct the candidate region(s); and selecting at least one of the candidate region(s) as logo region(s) for indicating the logo(s).

According to one embodiment of the claimed invention, a logo processing method is disclosed. The logo processing method comprises: detecting at least one logo; and changing at least one color of the at least one logo.

According to one embodiment of the claimed invention, a logo processing circuit is disclosed. The logo processing circuit comprises: a processing module, wherein within a plurality of video frames sequentially received from a video source, the processing module compares a base frame with at least a portion of the other video frames to generate a mask having at least one candidate region probably corresponding to at least one logo, and the processing module is capable of performing post processing on the mask to correct the candidate region(s) and selecting one of the candidate region(s) as a logo region for indicating the logo; and a storage unit coupled to the processing module for storing an indicator array having a plurality of indicators respectively corresponding to different locations in each video frame, wherein each indicator indicates whether a location is currently determined to probably have a logo thereon.

These and other objectives of the claimed invention will no doubt become obvious to those of ordinary skill in the art after reading the following detailed description of the preferred embodiment that is illustrated in the various figures and drawings.

DETAILED DESCRIPTION

Figure 1:
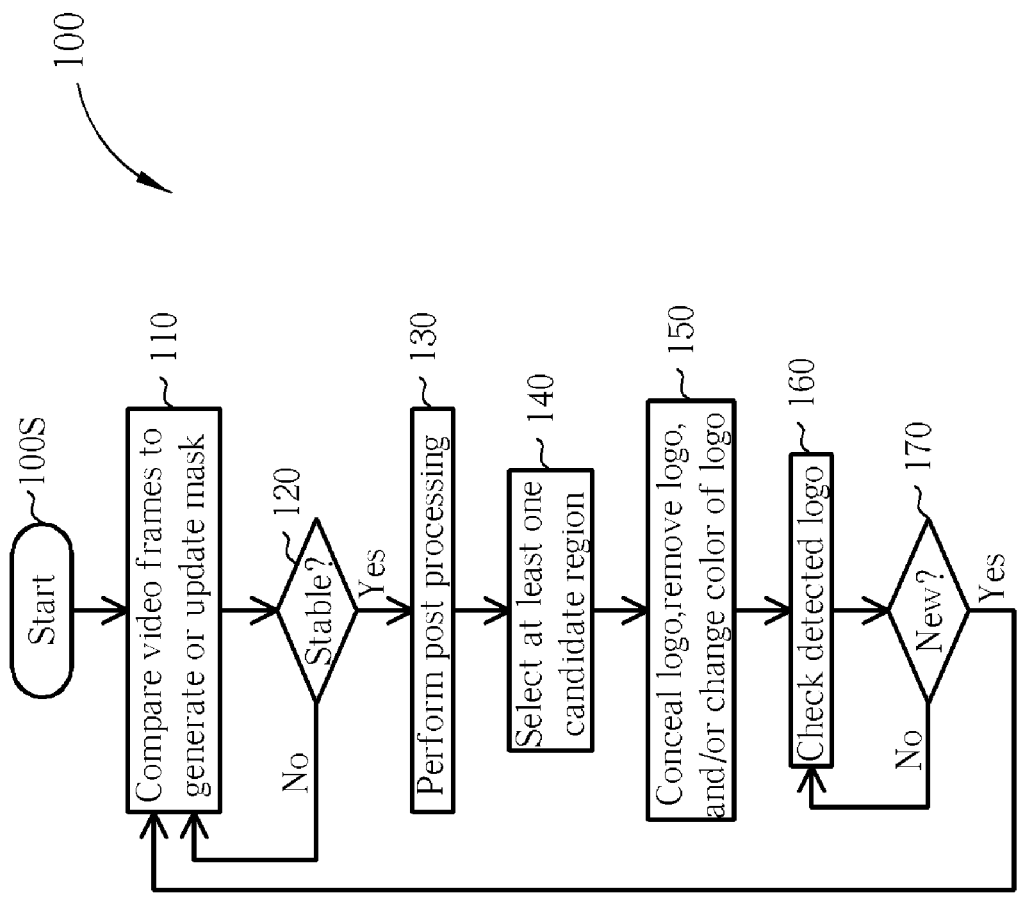
FIG. 1 is a flowchart of a logo processing method according to one embodiment of the present invention.

Please refer to FIG. 1. FIG. 1 is a flowchart of a logo processing method 100 according to one embodiment of the present invention. The logo processing method 100 can be implemented in at least a portion of a video playback device (not shown) by utilizing software, hardware, and/or firmware architecture. For example, the video playback device can be a digital versatile disc (DVD) player, and a logo processing circuit (not shown) executing the logo processing method 100 is positioned in the video playback device and coupled to an MPEG decoder therein for processing at least one logo that is originally mixed in a program stored in a DVD accessed by the DVD player. In another example, the video playback device can be a personal video recorder (PVR), and a logo processing circuit (not shown) executing the logo processing method 100 is positioned in the video playback device and coupled to a recording buffer therein for processing at least one logo that is originally mixed in a program received from a television (TV) tuner of the PVR.

The logo processing method 100 comprises detecting at least one logo (e.g., Steps 110-140) and changing at least one color of the at least one logo (e.g., Step 150). Here, changing the at least one color of the at least one logo typically means changing the color and/or the luminance of at least one portion of the logo periodically or randomly. As a result, burning out of display cells for displaying the logo can be prevented.

In Step 110, within a plurality of video frames F1, F2, F3, ..., Fn, ..., etc. that are sequentially received from a video source such as a DVD or a TV broadcasting system, compare a base frame F1 with at least a portion of the other video frames to generate a mask having at least one candidate region probably corresponding to at least one logo. Comparing the base frame with each of the other video frames pixel by pixel is applicable to the present invention, where it may take a lot of time to approach a stable state of the mask. In addition, selecting one video frame out of a plurality of video frames within a time period (e.g., for every N video frames, selecting one video frame) to form the portion of the other video frames, is also applicable to the present invention. According to this embodiment, performing shot detection on the video frames to identify a plurality of shots of the video frames, and selecting a key frame from the video frames corresponding to each shot for representing the shot, can be applied to Step 110. As a result, the portion of the other video frames comprises key frames of the shots.

Figure 2:
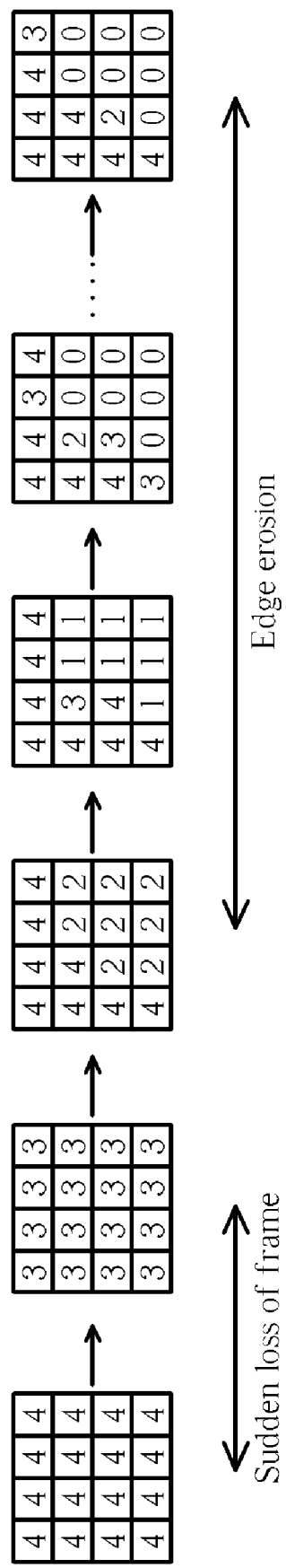
FIG. 2 illustrates variations of an indicator array according to one embodiment of the present invention, where the indicator array can be utilized for representing the mask mentioned in Step 110 shown in FIG. 1.

As shown in FIG. 2 illustrates variations of an indicator array according to one embodiment of the present invention, where the indicator array can be applied to the embodiment shown in FIG. 1. Here, the indicator array can be utilized for representing the mask mentioned in Step 110 shown in FIG. 1. Bi-state indicators (i.e., the elements of the indicator array or matrix) having two states such as "0" and "1" can be applied to the present invention, in order to represent the candidate region(s) in the mask utilizing one of the two states. According to this embodiment, multiple-state indicators having multiple-states as "0", "1", "2", "3", and "4" are utilized for representing the candidate region(s) in the mask, where the magnitude of an indicator represents possibility of a corresponding location having a logo thereon. The states of each indicator of the indicator array can be varied while updating the mask.

Applying the indicator array to the embodiment shown in FIG. 1, Step 110 further comprises respectively comparing a plurality blocks of the base frame F1 with corresponding blocks of a specific video frame of the portion of the other video frames mentioned above, where each block comprises at least one pixel of the frame comprising the block (i.e., 1 by 1 pixel), and more particularly, a plurality of pixels of the frame (e.g., 2 by 2 pixels, 4 by 4 pixels, and 8 by 8 pixels). Accordingly, in Step 110, updating the mask according to the latest comparison results corresponding to the blocks of the specific video frame leads to variations of the mask with respect to time such as those shown in FIG. 3.

Figure 3:
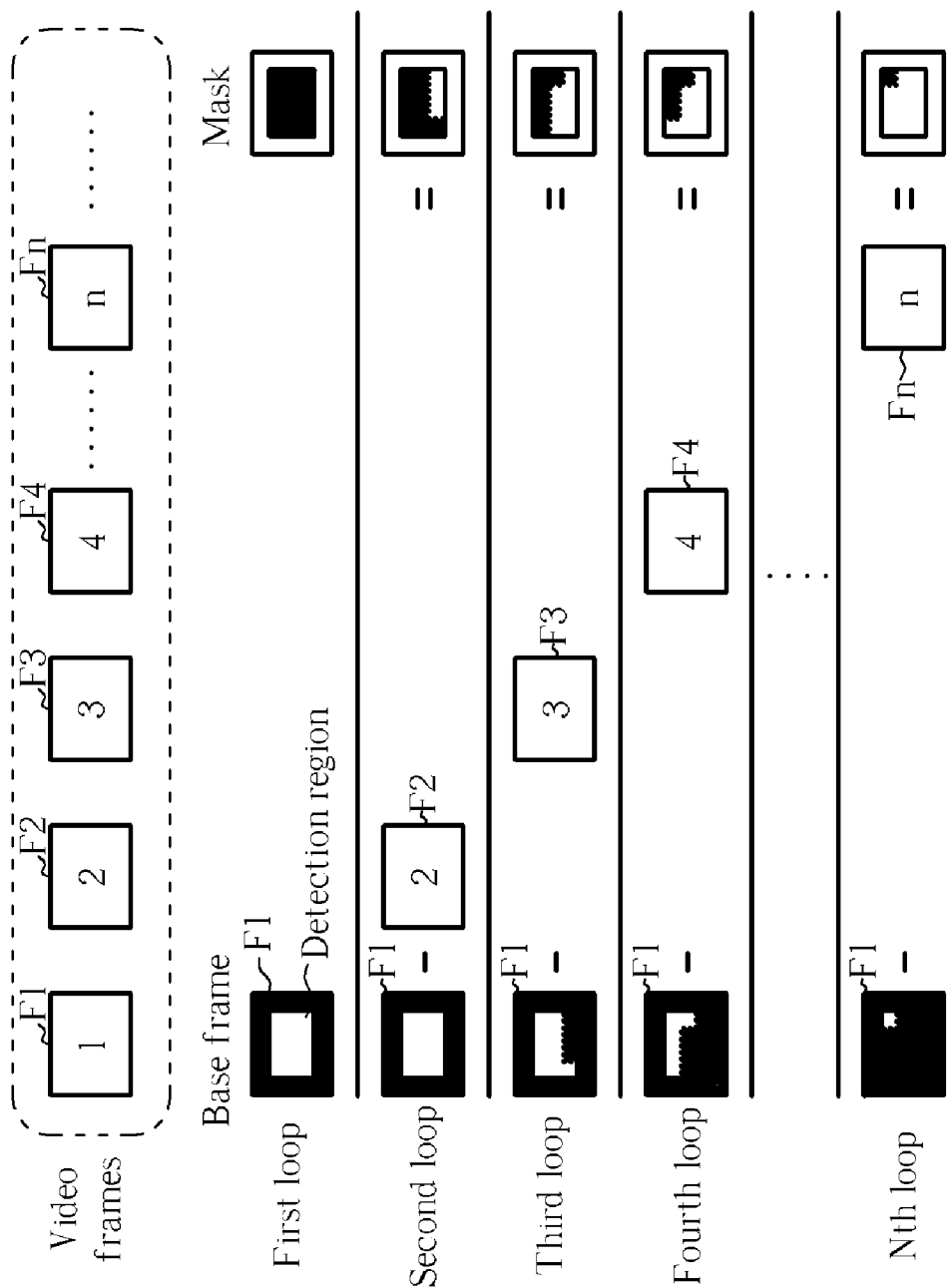
FIG. 3 illustrates variations of a mask with respect to time according to one embodiment of the present invention.

As shown in FIG. 3, a detection region is utilized for excluding margin comparison between the video frames in a first loop, and for further excluding redundant comparison between the video frames. The initial size of the detection region can be determined to be smaller than that of a video frame, in order to exclude the margins thereof. In addition, the initial size can be further determined or altered according to a dark margin detection on at least one video frame, for example, the base frame F1, in order to exclude dark margins due to different aspect ratios of program images and the video frames (e.g., if the program images having the aspect ratio of 16:9 are recorded on the video frames having the aspect ratio of 4:3, there are typically dark margins above and below the program images).

As time goes by, once a block is determined to have no logo therein or thereon due to variations of the block with respect to time, the block is labeled to be a no-logo block, which means no further comparison related to this block is needed in the coming loop(s) shown in FIG. 3. In addition, comparison between the video frames typically means comparing pixel values of the video frames, where different implementation choices can be applied to this embodiment.

According to one implementation choice, each block comprises only pixel (i.e., 1 by 1 pixel), and Step 110 compares a pixel value of the pixel of each block of the base frame F1 with a pixel value of the pixel of a corresponding block of the specific video frame to generate one of the latest comparison results. According to a variation of the implementation choice mentioned above, Step 110 comprises calculating a difference between the pixel value of the pixel of each block of the base frame and the pixel value of the pixel of the corresponding block of the specific video frame, and comparing the difference with a threshold value. Here, the threshold is utilized in order to prevent erroneous influence due to noises.

According to another implementation choice, each block comprises a plurality of pixel (e.g., 2 by 2 pixel), and Step 110 compares an average value of pixel values of the pixels of each block of the base frame with an average value of pixel values of the pixels of a corresponding block of the specific video frame, to generate one of the latest comparison results. According to a variation of the implementation choice mentioned above, Step 110 comprises calculating a difference between the average value of the pixel values of the pixels of each block of the base frame and the average value of the pixel values of the pixels of the corresponding block of the specific video frame, and comparing the difference with a threshold value.

According to another implementation choice, each block comprises a plurality of pixel (e.g., 2 by 2 pixel), and Step 110 respectively compares pixel values of at least one portion of the pixels of each block of the base frame with pixel values of corresponding pixels of a corresponding block of the specific video frame, to calculate the number of unvaried pixels in the corresponding block of the specific video frame with respect to the block of the base frame. Step 110 further generates one of the latest comparison results according to the number of unvaried pixels and the number of pixels in each block. According to a variation of the implementation choice mentioned above, Step 110 respectively calculates differences between the pixel values of the at least one portion of the pixels of each block of the base frame and the pixel values of the corresponding pixels of the corresponding block of the specific video frame, and respectively compares the differences with a threshold value.

Figure 4:
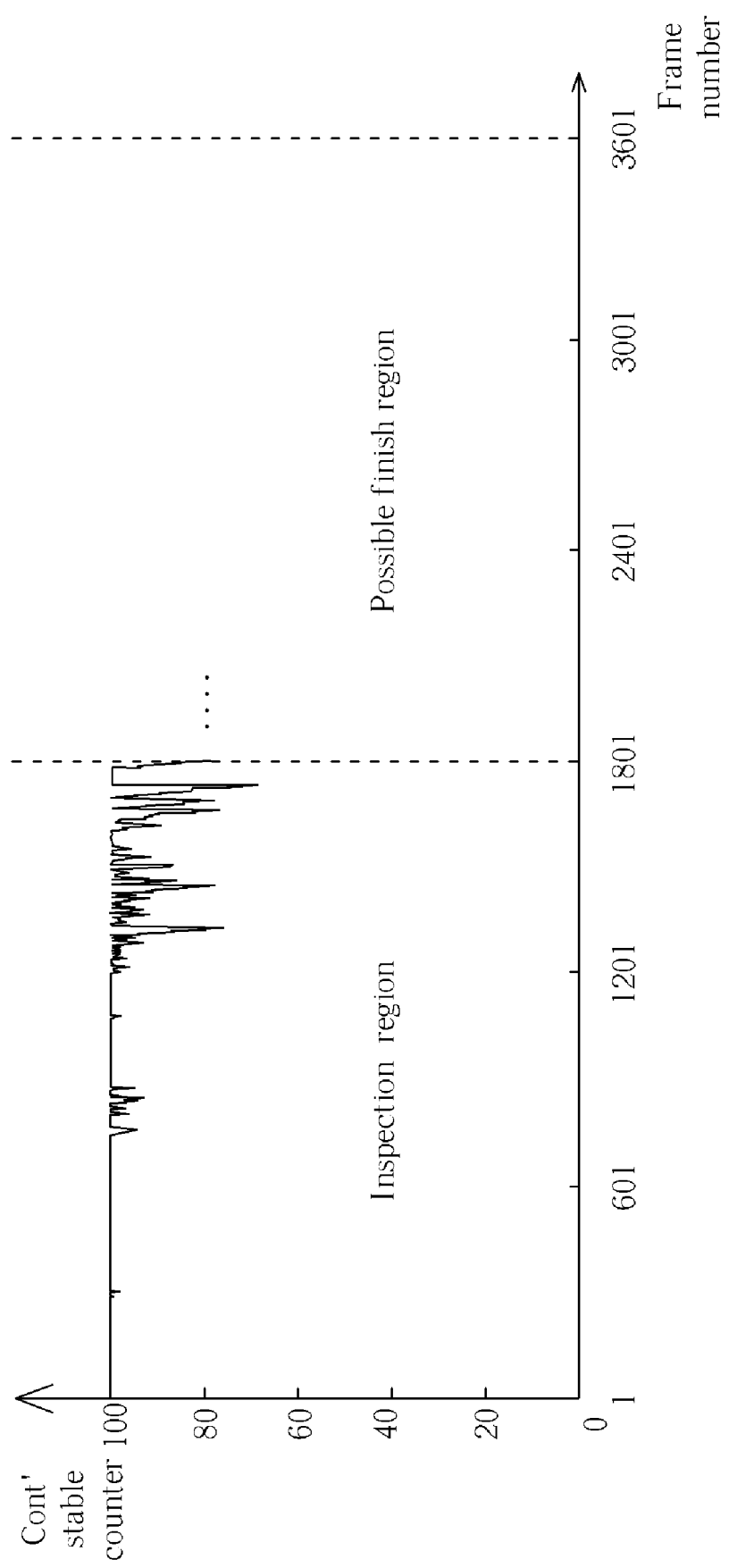
FIG. 4 is a diagram illustrating the timing for finishing comparing the base frame with the portion of the other video frames according to one embodiment of the present invention.

FIG. 4 is a diagram illustrating the timing for finishing comparing the base frame F1 with the portion of the other video frames according to one embodiment of the present invention, where an inspection region corresponding to the frame numbers of video frames F1, F2, . . . , and F1 800, and a possible finish region corresponding to the frame numbers of video frames F1 801, F1 802, . . . , and F3 600, are defined, so in Step 110, comparison between the base frame with the portion of the other video frames continues within the inspection region, and finishes within the possible finish region. During the possible finish region, Step 110 and Step 120 are executed alternatively to check whether the mask is stable by utilizing a continuously (Cont') stable counter, where the counter value thereof is monitored to generate the curve shown in FIG. 4. According to this embodiment, the counter value of the Cont' stable counter has an initial value of one hundred. If the mask is not varied or has no need to be varied after the comparison between the specific video frame the base frame F1, the counter value is decreased with a decrement such as one; otherwise, the counter value is increased with an increment larger than the decrement. Applying the simplest implementation choice to this embodiment, increasing the counter value with an increment larger than the decrement can be replaced by resetting the counter value to be the initial value. As a result, if the mask is not varied or has no need to be varied while the frame number varies, the counter value is decreased and finally becomes zero.

In the embodiment shown in FIG. 4, the comparison between the base frame with the portion of the other video frames is typically finished if the counter value becomes zero within the possible finish region. However, if the counter value becomes zero within the inspection region, the comparison between the base frame with the portion of the other video frames continues until the end of the inspection region is reached. In some occasions, if the counter value has not become zero till the end of the possible finish region is reached, the comparison between the base frame with the portion of the other video frames is forced to be finished.

According to a variation of the embodiment shown in FIG. 4, Step 120 can be omitted and Step 110 is repeated until the end of the inspection region is reached, so the comparison in Step 110 is forced to be finished at the end of the inspection region.

According to the embodiment shown in FIG. 1, Step 130 typically comprises performing a dilation operation on each candidate region to correct a contour thereof, and grouping a plurality of adjacent candidate regions into one to correct the number of candidate regions. The post processing are performed on the mask to correct the candidate region(s) to resolve some problems that are typically induced due to noises. In this embodiment, each candidate region is labeled with a specific index (e.g., a specific number) for further utilization in the coming steps. According to a variation of the embodiment mentioned above, if there exists a candidate region having its size of about two or three pixels, the candidate region is considered to be too small and will not be labeled with a specific index since this kind of candidate region is typically generated due to noises.

Figure 5:
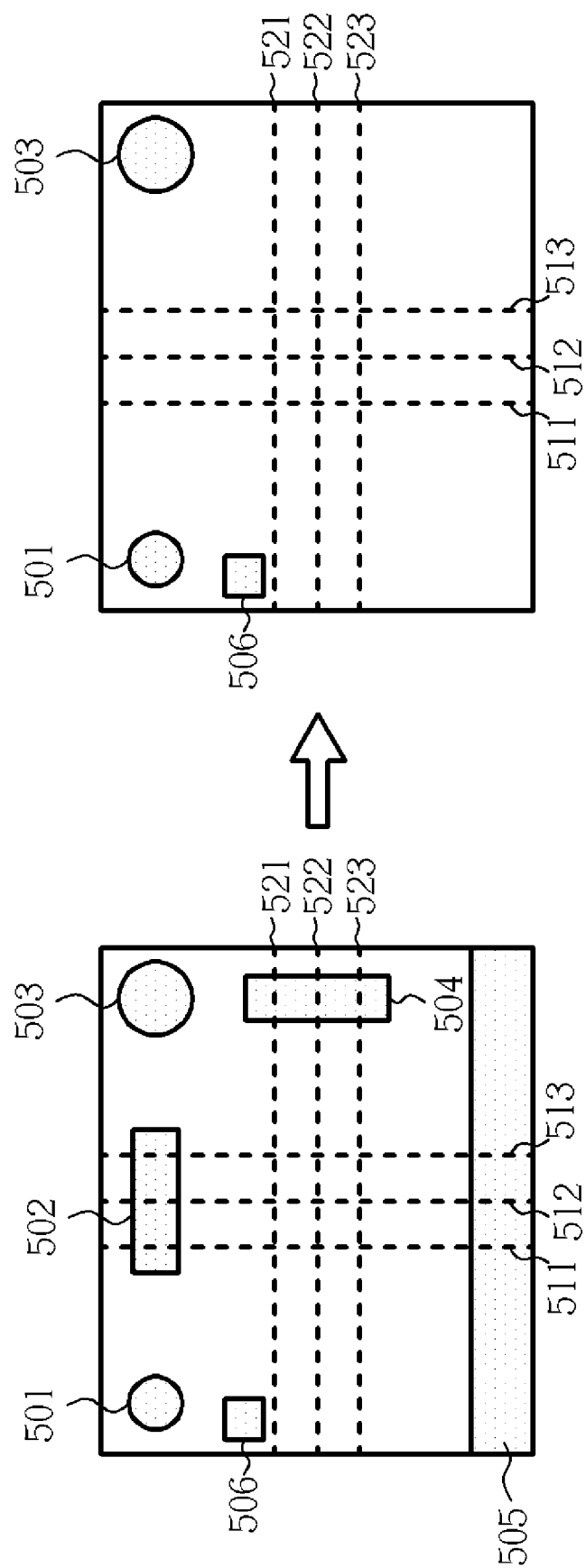
FIG. 5 illustrates a position analysis procedure involved in Step 140 shown in FIG. 1 according to one embodiment of the present invention.

In Step 140, select at least one of the candidate region(s) as logo region(s) for indicating the logo(s). A position analysis procedure and a size analysis procedure are typically involved in Step 140, where the order of performing these two procedures can be changed. Referring to FIG. 5 as an example, each of the candidate regions 502, 504, and 505, which are crossed by rejection lines 511, 512, 513, 521, 522, and 523 shown in FIG. 5, is rejected in the position analysis procedure and will not be labeled as a logo region. On the other hand, the remained candidate regions, for example, the candidate regions 501, 503, and 506 shown in FIG. 5, are sorted by their sizes in the size analysis procedure. As a result, the first m largest candidate regions are selected as logo regions, where m is a positive integer. For example, if m is equal to two, the candidate regions 501 and 503 are selected as the logo regions. Therefore, the logos respectively represented by the candidate regions 501 and 503 are detected.

In Step 150, color(s) of at least one logo detected in Step 140 can be changed. As mentioned, removing or concealing the logo(s) can be performed in Step 150.

In Step 160, within each logo region of the mask, the detected logo is checked. In Step 170, if a new logo is detected according to a calculation result of Step 160, reenter Step 110; otherwise, reenter Step 160.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A logo processing method, comprising utilizing a logo processing circuit to perform the steps of:
    within a plurality of video frames sequentially received from a video source, iteratively comparing a same base frame with associated frames of at least a portion of the other video frames to generate a mask having at least one candidate region probably corresponding to at least one logo and narrowing the candidate region during iterations of generating the mask, wherein the same base frame is compared with an associated frame of the associated frames in each of the iterations;
    after the iterations of generating the mask, performing post processing on the mask to correct the candidate region(s); and
    selecting at least one of the candidate region(s) as logo region(s) for indicating the logo(s).

2. The logo processing method of claim 1, further comprising:
    performing shot detection on the video frames to identify a plurality of shots of the video frames; and
    selecting a key frame from the video frames corresponding to each shot for representing the shot;
    wherein the portion of the other video frames comprises key frames of the shots.

3. The logo processing method of claim 1, wherein the video frames comprise more than two frames; and the at least one portion of the other video frames comprises all the video frames except the base frame.

4. The logo processing method of claim 1, further comprising:
    for every N video frames, selecting one video frame to form the portion of the other video frames.

5. The logo processing method of claim 1, wherein the step of iteratively comparing the base frame with the associated frames of the portion of the other video frames further comprises:
    respectively comparing a plurality blocks of the base frame with corresponding blocks of the associated frame, wherein each block comprises at least one pixel of the frame comprising the block; and
    updating the mask according to the latest comparison results corresponding to the blocks of the specific video frame.

6. The logo processing method of claim 5, wherein each block comprises a plurality of pixels of the frame comprising the block, and the step of respectively comparing the blocks of the base frame with the corresponding blocks of the associated frame further comprises:
    comparing an average value of pixel values of the pixels of each block of the base frame with an average value of pixel values of the pixels of a corresponding block of the associated frame, to generate one of the latest comparison results.

7. The logo processing method of claim 6, wherein the step of comparing the average value of the pixel values of the pixels of each block of the base frame with the average value of the pixel values of the pixels of the corresponding block of the associated frame further comprises:
    calculating a difference between the average value of the pixel values of the pixels of each block of the base frame and the average value of the pixel values of the pixels of the corresponding block of the associated frame; and
    comparing the difference with a threshold value.

8. The logo processing method of claim 5, wherein each block comprises a plurality of pixels of the frame comprising the block, and the step of respectively comparing the blocks of the base frame with the corresponding blocks of the associated frame further comprises:
    respectively comparing pixel values of at least one portion of the pixels of each block of the base frame with pixel values of corresponding pixels of a corresponding block of the associated frame, to calculate the number of unvaried pixels in the corresponding block of the associated frame with respect to the block of the base frame; and
    generating one of the latest comparison results according to the number of unvaried pixels and the number of pixels in each block.

9. The logo processing method of claim 8, wherein the step of respectively comparing the pixel values of the at least one portion of the pixels of each block of the base frame with the pixel values of the corresponding pixels of the corresponding block of the associated frame further comprises:

respectively calculating differences between the pixel values of the at least one portion of the pixels of each block of the base frame and the pixel values of the corresponding pixels of the corresponding block of the associated frame; and respectively comparing the differences with a threshold value.

10. The logo processing method of claim 5, wherein each block comprises one pixel, and the step of respectively comparing the blocks of the base frame with the corresponding blocks of the associated frame further comprises:

comparing a pixel value of the pixel of each block of the base frame with a pixel value of the pixel of a corresponding block of the associated frame to generate one of the latest comparison results.

11. The logo processing method of claim 10, wherein the step of comparing the pixel value of the pixel of each block of the base frame with the pixel value of the pixel of the corresponding block of the associated frame further comprises:

calculating a difference between the pixel value of the pixel of each block of the base frame and the pixel value of the pixel of the corresponding block of the associated frame; and comparing the difference with a threshold value.

12. The logo processing method of claim 1, further comprising:

utilizing an indicator array having a plurality of indicators respectively corresponding to different locations in each video frame, wherein each indicator indicates whether a location is currently determined to probably have a logo thereon.

13. The logo processing method of claim 12, further comprising:

updating the mask by updating the indicator array.

14. The logo processing method of claim 1, further comprising:

finishing comparing the base frame with the portion of the other video frames when or after the number of video frames that have been sequentially received from the video source reaches a first predetermined value.

15. The logo processing method of claim 14, further comprising:

finishing comparing the base frame with the portion of the other video frames when or before the number of video frames that have been sequentially received from the video source reaches a second predetermined value.

16. The logo processing method of claim 15, wherein the first and second predetermined values are equal to each other.

17. The logo processing method of claim 1, wherein the step of performing the post processing on the mask comprises:

performing a dilation operation on each candidate region to correct a contour thereof.

18. The logo processing method of claim 1, wherein the step of performing the post processing on the mask comprises:

grouping a plurality of adjacent candidate regions into one to correct the number of candidate regions.

19. The logo processing method of claim 1, further comprising:

changing at least one color of at least one of the logo(s).

20. The logo processing method of claim 19, wherein the step of changing the at least one color of the at least one of the logo(s) further comprises:

changing the at least one color of the at least one of the logo(s) by changing at least one of the color and luminance of at least one portion of the at least one of the logo(s) periodically or randomly.

21. A logo processing circuit, comprising:

a processing module, wherein within a plurality of video frames sequentially received from a video source, the processing module iteratively compares a same base frame with associated frames of at least a portion of the other video frames to generate a mask having at least one candidate region probably corresponding to at least one logo and narrows the candidate region during iterations of generating the mask, and after the iterations of generating the mask, the processing module is capable of performing post processing on the mask to correct the candidate region(s) and selecting one of the candidate region(s) as a logo region for indicating the logo, wherein the same base frame is compared with an associated frame of the associated frames in each of the iterations; and a storage unit coupled to the processing module for storing an indicator array having a plurality of indicators respectively corresponding to different locations in each video frame, wherein each indicator indicates whether a location is currently determined to probably have a logo thereon.

22. The logo processing circuit of claim 21, wherein the processing module updates the mask by updating the indicator array.

* * * * *